US008418013B2

(12) United States Patent
Sulzer et al.

(10) Patent No.: US 8,418,013 B2
(45) Date of Patent: Apr. 9, 2013

(54) METHOD OF USING VIRTUAL INPUTS AND OUTPUTS TO AUTOMATE TESTING OF APPLICATION SOFTWARE AND HARDWARE

(75) Inventors: Bryan D. Sulzer, Dubuque, IA (US); Scott J. Breiner, Dubuque, IA (US)

(73) Assignee: Deere & Company, Moline, IL (US)

( * ) Notice: Subject to any disclaimer, the term of this patent is extended or adjusted under 35 U.S.C. 154(b) by 504 days.

(21) Appl. No.: 11/339,435

(22) Filed: Jan. 25, 2006

(65) Prior Publication Data
US 2007/0174751 A1 Jul. 26, 2007

(51) Int. Cl.
*G01R 31/3183* (2006.01)
*G01R 31/40* (2006.01)

(52) U.S. Cl.
USPC ............ 714/742; 714/735; 714/741

(58) Field of Classification Search ............ None
See application file for complete search history.

(56) References Cited

U.S. PATENT DOCUMENTS

| | | | | |
|---|---|---|---|---|
| 4,692,299 A | * | 9/1987 | Crew et al. | 376/216 |
| 5,463,559 A | * | 10/1995 | Kirkpatrick et al. | 702/58 |
| 5,563,788 A | * | 10/1996 | Yoon | 701/31 |
| 5,815,511 A | * | 9/1998 | Yamamoto | 714/733 |
| 6,182,245 B1 | * | 1/2001 | Akin et al. | 714/38 |
| 6,564,128 B2 | * | 5/2003 | Baird et al. | 701/33 |
| 6,804,636 B2 | | 10/2004 | Senta et al. | |
| 6,804,796 B2 | * | 10/2004 | Gustavsson et al. | 714/38.1 |
| 6,968,427 B1 | * | 11/2005 | Yee | 711/118 |
| 7,313,035 B2 | * | 12/2007 | Lynch et al. | 365/189.12 |
| 2006/0150033 A1 | | 7/2006 | Kolb et al. | |

FOREIGN PATENT DOCUMENTS

| | | |
|---|---|---|
| JP | 52-113639 A | 9/1977 |
| JP | 60-164846 A | 8/1985 |
| JP | 09-120364 A | 5/1997 |
| WO | WO 2004/075011 | 9/2004 |
| WO | WO 2005/121915 | 12/2005 |

OTHER PUBLICATIONS

European Search Report issued by the European Patent Office, dated May 30, 2011, for Application No. EP07250295.8; 11 pages.

* cited by examiner

*Primary Examiner* — Ajay Bhatia
*Assistant Examiner* — Dipakkumar Gandhi
(74) *Attorney, Agent, or Firm* — Faegre Baker Daniels LLP

(57) ABSTRACT

The invention relates to automated hardware in the loop testing. A method of automated diagnostic testing is described as monitoring, modifying, overwriting, providing and/or providing read-only access to input data given to a tested application and output data provided by a tested application to compare a desired relationship between input data and output data. A preferred system includes a communication network with a preferred method including a controller area network to associate a test controlling system to a tested application. An automated diagnostic testing system comprises a test controlling system operably coupled to a tested application.

27 Claims, 1 Drawing Sheet

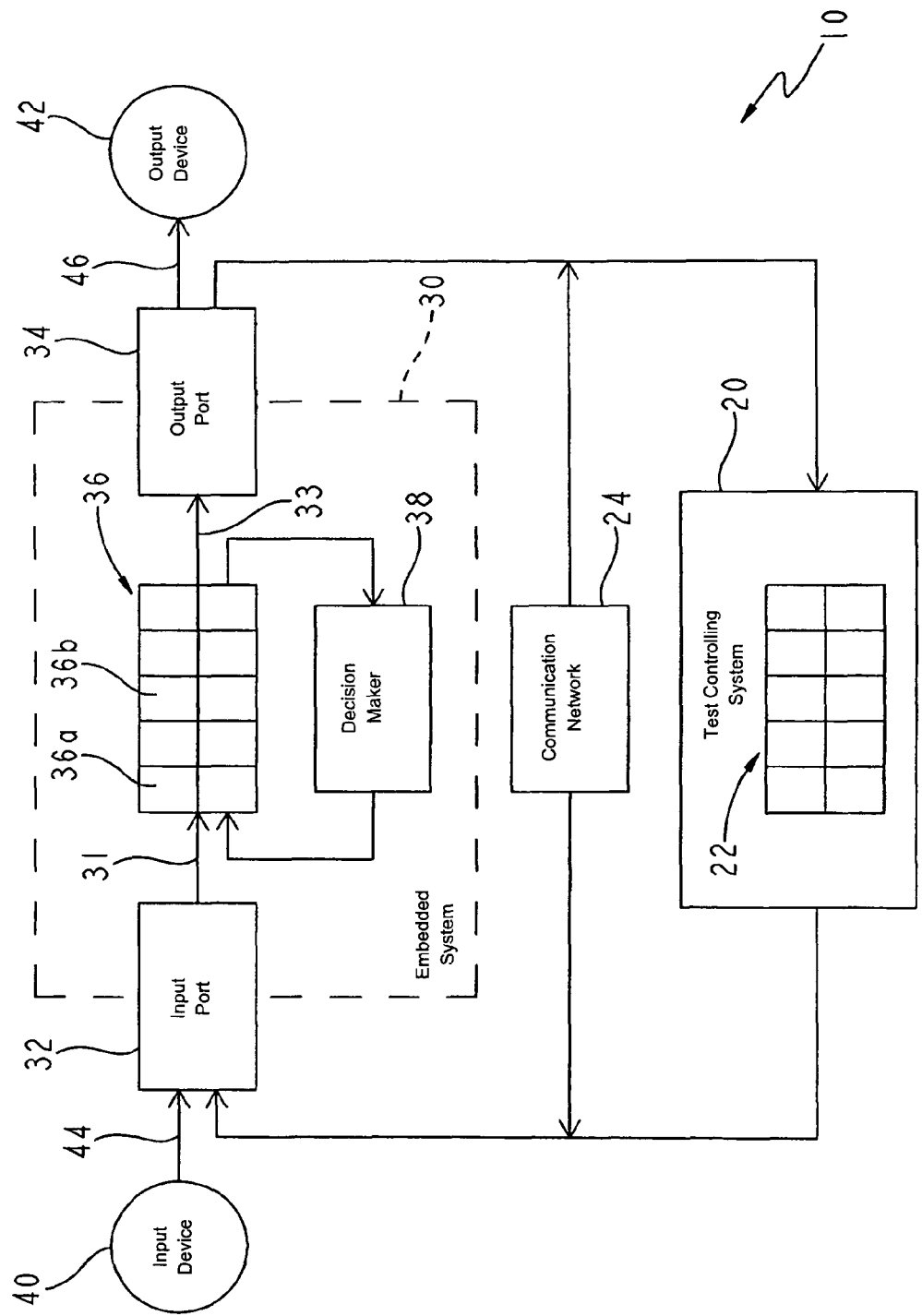

METHOD OF USING VIRTUAL INPUTS AND OUTPUTS TO AUTOMATE TESTING OF APPLICATION SOFTWARE AND HARDWARE

FIELD OF THE INVENTION

This invention relates to hardware in the loop (HIL) testing. In HIL testing, an embedded system is tested by simulating sensor readings and comparing the embedded system's response to desired results. This invention in particular addresses automated HIL testing. Automated HIL testing is achieved with a computer application monitoring and/or controlling the simulated sensor readings while monitoring and/or saving the embedded system's responses.

BACKGROUND AND SUMMARY OF THE INVENTION

HIL testing is used for development and testing of embedded systems. The present invention relates to the use of virtual inputs and outputs in combination with a test controlling system to automate HIL testing. The test controlling system handles automation and coordination of the virtual inputs and outputs to produce a coherent test and associated test reports and documentation. In accordance with a preferred embodiment of the invention, a J1939 controller area network (CAN) is utilized to associate the virtual inputs and outputs to the test controlling system as well as connecting the test controlling system to the embedded system. Several communication networks can serve this purpose.

The method of diagnostic testing has at least two methods of operation. First, the test controlling system can monitor the input port and/or the output port of the embedded tested system for input values and output values, respectively. The test controlling system can send CAN messages to an embedded system to enable reading of input values and/or output values of associated memory locations, respectively. The embedded system will then send a response containing value (s) of requested input and/or output. Under this mode of operation the test controlling system allows for detection of problems at three possible areas: (1) prior to an embedded system, including any electrical conductors operably coupling an input device to an embedded system; (2) the embedded system, including the embedded system's decision making processes; and (3) after the embedded system, including any electrical conductors operably coupling an output device to the embedded system. In a tested apparatus with several connected embedded systems, the test controlling system is useful to determine which embedded system is faulty faster than individually testing each embedded system.

Second, the test controlling system can modify and replace input values. Under this mode of operation, the test controlling system overrides predefined input values to replace them with input values supplied by the test controlling system. One embodiment involves initialization of virtual inputs and outputs by use of a CAN override message sent by the test controlling system. The test controlling system provides input values to an embedded system. Then the test controlling system monitors the embedded system's output values and/or writes the embedded system's output values to a separate memory location. Finally the test controlling system produces coherent test and associated test reports and documentation. In a variation, the embedded system has read-only access to the modified input value. The purpose of providing the embedded system with read-only access is to prevent tampering of the input value and to disable the embedded system's ability to modify the input value in memory. In an alternative variation, the embedded system has the modified input value stored in a memory location separate from the embedded system's typical memory location.

DETAILED DESCRIPTION OF THE INVENTION

One aspect of the present invention relates to a method of automated diagnostic testing of an electronic controller. Hereinafter, an embedded system is occasionally referred to as either a tested application or an electronic controller. A tested application is monitored for output data. The output data is written to a memory location associated with a test controlling system and the test controlling system compares a desired relationship between input and the output data consistent with HIL testing. Generally, any communication network, such as a CAN, can be utilized to connect the test controlling system to the tested application.

One embodiment of the present invention involves the test controlling system monitoring input data supplied to the tested application. The test controlling system can command the tested application to provide read-only access by the tested application to the input data.

Another embodiment of the present invention involves the test controlling system modifying input supplied to the tested application. Variations of this embodiment entail providing read-only access by the tested application to the input data as well as storing the modified input in a memory location associated with said tested application. A similar embodiment of the present invention is the test controlling system overwriting data supplied to the tested application by an input device. A variation applies to overwriting input supplied to the tested application: providing the tested application read-only access to the overwritten input data. Another variation applies where the test controlling system limits access to output data associated with a tested application. A further embodiment of the present invention is the test controlling system providing input values to the tested application instead of the tested application receiving input from another source. There are a couple of variations to this further embodiment including the test controlling system allowing the tested application to have read-only access to the provided input values and the provided input values are held in a memory location separate from a memory location utilized by said tested application.

A second aspect of the present invention relates to the physical apparatus, an automated diagnostic testing system. The test controlling system can operably couple to a tested application through the tested application's input ports. One embodiment of the test controlling system includes a program which provides for writing a virtual value to an input port or to a memory location associated with the tested application. The test controlling system can utilize any communication network, such as a CAN, to connect the test controlling system to the tested application.

The test controlling system can also operably couple to a tested application through the tested application's output ports. A second embodiment of the test controlling system includes a program which reads output data associated with the tested application and then provides for writing the output data. The test controlling system can utilize any communication network, such as a CAN, to connect the test controlling system to the tested application. A third embodiment of the test controlling system includes both the first and second embodiments.

A third aspect of the present invention relates to a method of using an automated diagnostic tester for an electronic controller. In accordance with this aspect of the invention, the method includes operably coupling a test controlling system to an input port of a tested application and operably coupling the test controlling system to an output port of the tested application. Under one embodiment, the test controlling system can monitor input data from a tested application, provide input data to an input port and monitor output data from a tested application. Furthermore, the test controlling system provides for validating a desired relationship between either said data associated with a tested application or said input data provided by the test controlling system and an output data.

BRIEF DESCRIPTION OF THE DRAWINGS

FIG. 1 is a perspective view of an illustrative embodiment automated diagnostic testing system. Corresponding reference characters indicate corresponding parts throughout the several views. The exemplifications set out herein illustrate a preferred embodiment of the invention, in one form thereof, and such exemplifications are not to be construed as limiting the scope of the invention in any manner.

DETAILED DESCRIPTION OF THE DRAWING

The embodiments described below are merely exemplary and are not intended to limit the invention to the precise forms disclosed. Instead, the embodiments were selected for description to enable one of ordinary skill in the art to practice the invention.

Referring to FIG. 1, an automated diagnostic testing system 10 according to the present disclosure includes a test controlling system 20 configured to operably couple to an embedded system 30. The test controlling system 20 includes a memory location 22, at least one program for handling automation and coordination to produce a test and associated test reports, and optionally a communication network 24. The test controlling system 20 can handle automation by doing tasks such as receiving input/output data. The test controlling system 20 can handle test coordination and test report coordination by doing such tasks as sending messages for requests of information and changing access rights to input/output data.

The embedded system 30 includes an input port 32, a memory 36 having a first memory location 36a and a second memory location 36b, a decision maker 38, and an output port 34. Input port 32 is where embedded system 30 receives input data used to make a decision. At input port 32, test controlling system 20 is operably coupled to embedded system 30. Optionally, embedded system 30 includes an input device 40 operably coupled by an electrical conductor 44. Input device 40 provides input data to embedded system 30 through input port 32. When test controlling system 20 is operably coupled to embedded system 30, test controlling system 20 can monitor, provide, modify, or overwrite input data provided to embedded system 30.

Optionally, embedded system 30 also includes an output device 42 operably coupled by an electrical conductor 46. Output port 34 is where embedded system 30 supplies output data. At output port 34, test controlling system 20 is also operably coupled to embedded system 30.

Normally output device 42 acts upon output data supplied by embedded system 30. When test controlling system 20 is operably coupled to embedded system 30, test controlling system 20 can monitor, read, or write output data provided by embedded system 30.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims. Although the drawings represent embodiments of the present invention, the drawings are not necessarily to scale and certain features may be exaggerated in order to better illustrate and explain the present invention.

DESCRIPTION OF A EMBODIMENT OF THE INVENTION

The embodiment described below is merely exemplary and is not intended to limit the invention to the precise form disclosed. Instead, the embodiments were selected for description to enable one of ordinary skill in the art to practice the invention.

Referring to FIG. 1, a test controlling system 20, according to one embodiment of the present invention, can be a computer program with controller area network based testing functionality and the electrical conductors necessary to couple the test controlling system 20 to an embedded system 30. The computer program and embedded system 30 can be operably coupled at input and output ports 32 and 34 of the embedded system 30. Embedded system 30, according to one embodiment of the present invention, can be an electronic controller with attached input and output devices 40 and 42. Input device 40 can be an engine area temperature sensor. Output device 42 can be an engine fan.

According to one embodiment of the present invention, input data supplied by the engine area temperature sensor can be overwritten by input values supplied by a computer program to embedded system 30. Similar to input data supplied by the engine area temperature sensor, input values supplied by a computer program are analyzed by the electronic controller. After a decision is made, the electronic controller supplies output data to an output port 34. Output data could command the engine fan to turn on and direct the engine fan speed. The computer program can compare the input data to the output data to validate a desired relationship.

What is claimed is:

1. A method of automated diagnostic testing of an electronic controller comprising:
providing a tested application having a first input, a second input, and a first output, an input device coupled to the first input of the tested application, an output device coupled to the first output of the tested application, and a test controlling system operably coupled to the tested application through the second input of the tested application while the input device is operably coupled to the tested application through the first input of the tested application,
operating the tested application in a first, control mode to control the output device, the tested application providing a control output to the output device based on an input from the input device in the control mode,
operating the tested application in a second, test mode, the tested application providing a test output to the test controlling system based on a virtual value from the test controlling system in the test mode, and
comparing a desired relationship between the virtual value and the test output.

2. The method of claim 1, further comprising providing a controller area network associated with said test controlling system to operably couple said tested application to said test controlling system.

3. The method of claim 1, wherein said test controlling system provides for read only access of said virtual value.

4. The method of claim 1, further comprising modifying said virtual value.

5. The method of claim 4, wherein said test controlling system provides for read-only access of said virtual value to said tested application.

6. The method of claim 4, wherein the input device is for providing the input to the first input of the tested application, wherein said test controlling system provides for overwriting the input associated with the input device.

7. The method of claim 1, further comprising providing the input to the first input of said tested application.

8. The method of claim 7, wherein said test controlling system further provides for read-only access of said virtual value to said tested application.

9. The method of claim 7, further comprising the step of writing the virtual value to a first memory associated with the test controlling system, wherein said first memory is held in a location separate from a second memory location utilized by said tested application.

10. The method of claim 1, wherein the tested application has a second output and the test controlling system is operably coupled to both the second input and the second output of the tested application.

11. The method of claim 1, wherein the input from the input device is taken from an engine area.

12. An automated diagnostic testing system for use with an input device and an output device, the system comprising:
    a tested application having a first input, a second input, and a first output, the input device being operably coupled to the first input of the tested application and the output device being operably coupled to the first output of the tested application, and
    a test controlling system operably coupled to the tested application through the second input of the tested application while the input device is operably coupled to the tested application through the first input of the tested application and the output device is operably coupled to the first output of the tested application, wherein the test controlling system includes a program for writing a virtual value to the tested application, said test controlling system configured to evaluate a relationship between the virtual value supplied to said tested application and output data provided by said tested application.

13. The automated diagnostic testing system of claim 12, wherein said tested application is an electronic controller.

14. The automated diagnostic testing system of claim 12, further comprising a communication network associated with said test controlling system to operably connect said test controlling system with said tested application.

15. The automated diagnostic testing system of claim 12, wherein said test controlling system is operably coupled to an input port associated with said tested application, said program including an input program, wherein said input program provides for writing the virtual value to said input port or to a memory associated with said tested application.

16. The automated diagnostic testing system of claim 12, wherein said test controlling system is operably coupled to an output port associated with said tested application, said program including an output program, wherein said output program provides for reading said output data.

17. The automated diagnostic testing system of claim 16, wherein said output program further provides for writing said output data.

18. The automated diagnostic testing system of claim 16, further comprising said test controlling system operably coupled to an input port associated with said tested application, said program including a first program, wherein said first program provides for writing the virtual value to said input port or to a memory associated with said tested application.

19. The automated diagnostic testing system of claim 12, wherein the tested application has a second output and the test controlling system is operably coupled to both the second input and the second output of the tested application.

20. The automated diagnostic testing system of claim 12, wherein the input device is configured to provide an input to the first input of the tested application, wherein the test controlling system is configured to overwrite the input provided with the input device.

21. The automated diagnostic testing system of claim 12, wherein the input device comprises an engine area sensor.

22. The automated diagnostic testing system of claim 12, wherein the output device comprises an engine fan.

23. A method of using an automated diagnostic tester for an electronic controller comprising:
    providing a tested application operably coupled to a first input communication line, a second input communication line, and an output communication line,
    operably coupling the tested application to an input device and an output device by coupling the input device to the first input communication line and the output device to the output communication line,
    operably coupling a test controlling system to the tested application by coupling the test controlling system to the tested application through the second input communication line while retaining the input device operably coupled to the tested application through the first input communication line and the output device coupled to the output communication line,
    wherein the test controlling system provides a program for writing input data to the tested application and for receiving output data from the tested application, and
    validating a desired relationship between the input data and the output data.

24. The method of claim 23, wherein operably coupling said test controlling system to said tested application includes the step of providing a controller area network.

25. The method of claim 23, further comprising the step of analyzing input data written to the tested application.

26. The method of claim 23, further comprising the step of supplying the output data to the output communication line associated with the tested application.

27. The method of claim 23, further including the steps of providing an input to the first input communication line of the tested application with the input device and overwriting the input with the input data of the test controlling system.

* * * * *